Dec. 16, 1952 W. H. SCHMITT 2,621,885
O RING VALVE SEAT
Filed July 2, 1948

INVENTOR:
WILLIAM H. SCHMITT
BY W. E. Beatty
ATTORNEY.

UNITED STATES PATENT OFFICE 2,621,885

O RING VALVE SEAT

William H. Schmitt, Rialto, Calif., assignor to The Rialto Corporation, Rialto, Calif., a corporation of California Application July 2, 1948, Serial No. 36,667

2 Claims. (Cl. 251—75)

The invention relates to an O-ring valve seat and, more particularly, to inter-fitting members having a partial ring recess in each thereof, such partial recesses forming a combined recess which embraces the ring for more than 180° and thereby prevents its collapse out of the recess, while leaving a chordal or crown portion of the ring to protrude from the recess and serve as a valve seat.

The sealing and wearing qualities of an O-ring of neoprene are well known. The invention makes it possible to use an O-ring as a seat on the inside of a cylindrical bore for a plunger type of valve head, while preventing escape of the ring when the plunger moves beyond the ring. In this embodiment of the invention the ring recess is preferably made longer than the diameter of the ring whereby the ring can roll on its own axis and present a new sealing surface to the plunger as the plunger moves.

For further details of the invention, reference may be made to the drawings wherein Fig. 1 is a sectional view of a plunger type of valve wherein that part of the cylinder liner which is opposite the plunger portion of reduced diameter is provided with an O-ring valve seat according to the present invention.

Figure 1:
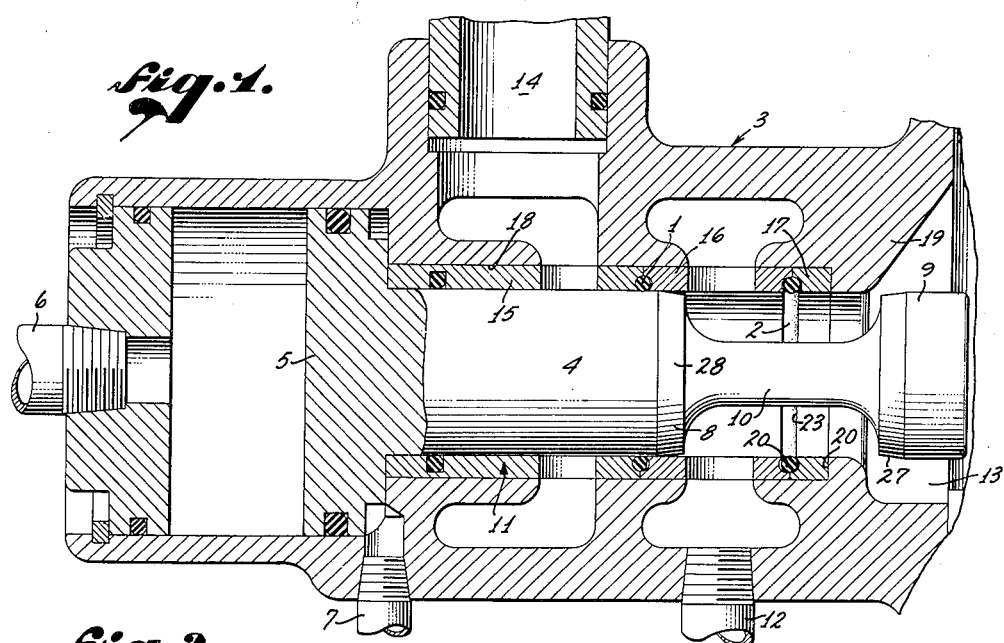

Referring in detail to the drawings, one form of the invention is illustrated as applied to the seats or seals 1 and 2 for a plunger or reciprocating type of valve 3 having a plunger 4. The plunger 4 is operated in any suitable manner, for example, by a piston head 5 with fluid pressure applied to the opposite sides thereof by way of the ports 6 and 7.

Plunger 4 has spaced heads 8 and 9 connected by a stem 10. The heads 8 and 9 slidingly fit in the cylinder or sleeve 11. With plunger 4 in the position shown, fluid pressure from inlet 12 can flow to port 13, seat 2 being inactive at this time while seat 1 is effective to seal off the pressure from port 14. When plunger 4 is in its alternate position to the left, the fluid pressure supply from inlet 12 is shut off from port 13 and admitted to port 14, seat 1 being idle at this time while seat 2 seals off the fluid pressure from inlet 12 to port 13.

The liner 11 is here illustrated as made up of a number of sections, indicated at 15, 16 and 17, which fit end to end and are suitably retained in the bore 18 in the casing 19. For example, the liner 11 may be press fitted in the bore 18 with the innermost section 17 abutting against shoulder 20.

Figure 2:
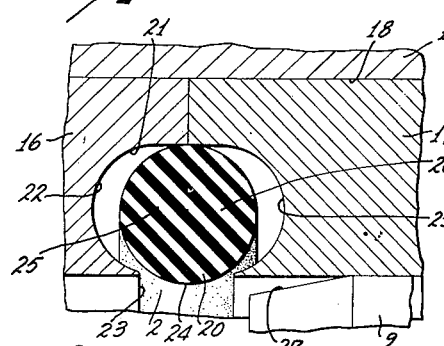
Fig. 2 is an enlarged sectional view of one of the valve seats of Fig. 1, showing the plunger away from the O-ring seat.
Figure 3:
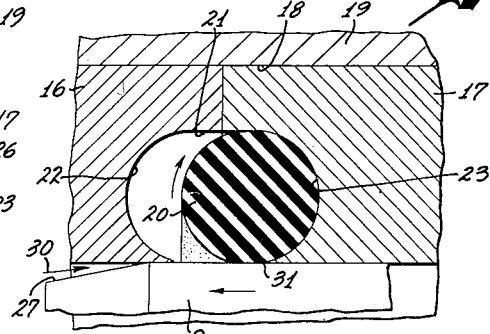
Fig. 3 is a view corresponding to Fig. 2 with the plunger opposite the O-ring.
Figure 4:
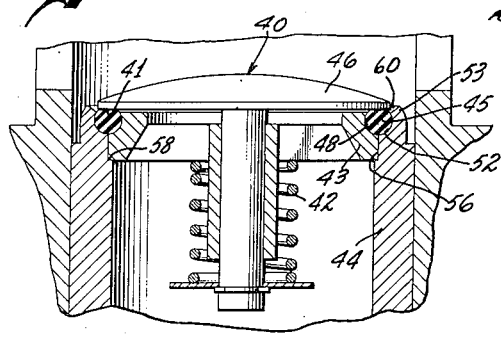
Figure 5:
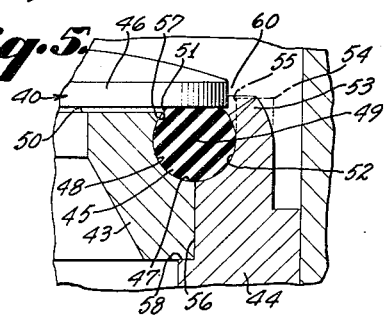

Both of the seats 1 and 2 are alike in construction and a typical section through one side of such seat is illustrated in Figs. 2 and 3 which illustrate the manner of preventing the O-ring 20 from collapsing when the head 8 or 9 moves away from the ring. While various other dimensions may be used, the following example is given to illustrate the invention. The seat 2 comprises an O-ring 20 of elastic material such as neoprene. Ring 20 is mounted in an annular recess 21, half of which, 22, is in the liner section 16, a mirror image thereof and, hence, a complementary half portion 23 being arranged in the liner section 17. The diameter of the ring section illustrated may be .139 inch, while the depth of the recess 21 is .125 inch, whereby the crown of the ring 20 protrudes through the annular opening 23, as indicated at 24. The contour of the concave recess 22 is substantially an arc of a circle, having a center at 25 while the other sleeve section 17 has the same concave contour with a center at 26. The centers 25 and 26 are spaced apart whereby the combined ring groove 21, in the direction of the axis of the valve, has a length greater than the diameter of the ring 20. The width of the opening 23 through which the crown 24 of the ring projects is substantially less than the diameter of the ring to prevent the ring from escaping or collapsing when the valve head like 9 moves away from the ring.

To prevent cutting the ring 20 and to facilitate its rolling action, the valve head 9 is tapered as indicated at 27 and the head 8 has a similar oppositely facing taper 28. The sleeve or liner 11 may be made of bronze, although other materials may be employed. Preferably the valve head 4 and sleeve 11 are lapped and ground to insure maximum quality of fit and performance.

The rings like 20 are assembled in their recesses like 21, for example, by placing ring 20 in recess 23 and then endwise moving the sleeve section 16 into position until the adjoining ends of section 16 and 17 abut, whereby the combined recess 21 embraces the ring for more than 180° to prevent escape of the ring 20, while permitting it to protrude through the annular opening 23.

When the head 9 moves to the left, as shown in Fig. 3, the ring 20 rotates in a clockwise direction and, due to pressure ahead of the piston, as indicated by arrow 30, the ring 20 moves in the opposite direction to the lagging side of the combined groove 21, namely, in the recess 23, and as the radius of recess 23 is smaller than the radius of the ring, such fluid pressure in compressing the ring, forces it against the recess 23 and against the head 9 as indicated at 31, thereby preventing leakage to the right past the head 9. As the ring 20 rotates on its own axis, it provides an effective seal and presents different portions of its surface to the sealing action as the head 9 reciprocates.

Various other modifications may be made in the invention without departing from the spirit of the following claims.

I claim:

1. A valve seat comprising seat members having complementary, annular, concave recesses forming a combined recess whereof the internal periphery subtends an angle around the axis of the combined recess of more than 180° and less than 360°, said seat members fitting together with the recess portion in one thereof forming a continuation of the recess portion in the other seat member, said seat members having outer portions respectively spaced apart and forming an annular opening for said combined recess, in combination with an O-ring of elastic material fitting in said combined recess, the depth of said combined recess being less than the diameter of said ring, with the crown of said ring projecting through said opening and forming a valve seat, said seat members being cylindrical, said seat members having a cylindrical bore, the length at the center of said combined recess parallel to the axis of said bore being greater than the diameter of said ring, in combination with a plunger valve head having a portion slidably fitting in said bore, means for operating said valve head to a position beyond said ring and said annular opening preventing collapse of said ring at that time, said plunger having a tapered portion to prevent cutting said ring on movement of said plunger across said ring, said plunger valve head with assistance of pressure head of said valve head comprising means for rolling said ring on its own axis in said combined recess.

2. A ring seal comprising a sleeve retainer for an elastic O-ring, said retainer comprising abutting sleeve members each having an annular concave recess for the ring in the inner portion of the sleeve member, said recesses conjoining at one side to form the bottom of the ring recess and opening through the inside wall of the sleeve to provide an annular opening having a width greater than the radius and less than the diameter of the ring, said ring when unflexed protruding through said opening, each of said recesses having an arcuate wall having a radius less than the radius of the ring and the centers of said radii being spaced apart and the central portion of said ring recess being longer than the diameter of said ring; and a plunger slidably fitting said sleeve retainer, said plunger being movable across and beyond said opening through which said ring protrudes, said plunger with the assistance of pressure ahead of the plunger comprising means for rolling said ring on its own axis in the direction against the movement of said plunger whereby said ring presents a new sealing surface to the plunger as the plunger moves.

WILLIAM H. SCHMITT.

REFERENCES CITED

The following references are of record in the file of this patent:

UNITED STATES PATENTS

| Number | Name | Date |
| --- | --- | --- |
| 1,639,853 | Maanum | Aug. 23, 1927 |
| 1,744,798 | Price | Jan. 28, 1930 |
| 1,909,480 | Wilson | May 16, 1933 |
| 1,988,545 | Donn | Jan. 22, 1935 |
| 2,115,383 | Christensen | Apr. 26, 1938 |
| 2,310,536 | Melsom | Feb. 9, 1943 |
| 2,394,264 | Christensen | Feb. 5, 1946 |
| 2,417,494 | Hoof | Mar. 18, 1947 |
| 2,485,504 | Morgan | Oct. 18, 1949 |

FOREIGN PATENTS

| Number | Country | Date |
| --- | --- | --- |
| 38 | Great Britain | of 1870 |
| 7,142 | Great Britain | of 1909 |
| 177,010 | Switzerland | of 1935 |